(12) United States Patent
Cho

(10) Patent No.: US 7,130,654 B2
(45) Date of Patent: Oct. 31, 2006

(54) WIRELESS HEADSET HAVING A LOCAL AREA COMMUNICATION MODULE AND BEING DETACHABLE FROM A COMMUNICATION DEVICE

(75) Inventor: Sung-Woo Cho, Suwon-shi (KR)

(73) Assignee: Samsung Electronics Co., Ltd. (KR)

( * ) Notice: Subject to any disclaimer, the term of this patent is extended or adjusted under 35 U.S.C. 154(b) by 341 days.

(21) Appl. No.: 10/753,824

(22) Filed: Jan. 8, 2004

(65) Prior Publication Data

US 2004/0242264 A1 Dec. 2, 2004

(30) Foreign Application Priority Data

Jan. 9, 2003 (KR) ...................... 10-2003-0001455

(51) Int. Cl.
*H04M 1/00* (2006.01)

(52) U.S. Cl. .............................. 455/550.1; 455/575.1; 455/90.3; 455/569.2; 455/347; 379/428.02

(58) Field of Classification Search ............. 455/550.1, 455/575.1–9, 403, 379, 347, 90.3, 569.2
See application file for complete search history.

(56) References Cited

U.S. PATENT DOCUMENTS 5,943,627 A * 8/1999 Kim et al. ............... 455/569.1
2002/0067825 A1 * 6/2002 Baranowski et al. ........ 379/430

* cited by examiner

*Primary Examiner*—Nick Corsaro
*Assistant Examiner*—Sayed T. Zewari
(74) *Attorney, Agent, or Firm*—Dilworth & Barrese LLP

(57) ABSTRACT

Disclosed is a wireless headset apparatus using a local area communication, comprising an attachment recess formed at a designated position of a communication equipment, and a wireless headset detachably attached to the attachment recess.

11 Claims, 8 Drawing Sheets

US 7,130,654 B2

WIRELESS HEADSET HAVING A LOCAL AREA COMMUNICATION MODULE AND BEING DETACHABLE FROM A COMMUNICATION DEVICE

PRIORITY

This application claims priority to an application entitled "WIRELESS HEADSET APPARATUS", filed in the Korean Industrial Property Office on Jan. 9, 2003 and assigned Ser. No. 2003-01455, the contents of which are hereby incorporated by reference.

BACKGROUND OF THE INVENTION

1. Field of the Invention

The present invention relates to a wireless headset apparatus, and more particularly to a wireless headset apparatus detachably attached to a communication equipment using a local area communication module.

2. Description of the Related Art

Conventionally, as communication equipment such as a portable terminal, a computer, and electric appliances such as personal digital assistants (PDAs), or acoustic equipment such as portable radios, CD players and DVD players have been miniaturized, wireless headsets in wireless connection with the communication equipment at a close range have become widely used. Such a wireless headset, which is connected to the communication equipment at a close range via a wireless network, employs a BlueTooth (BT) system as a local area wireless communication standard so as to achieve bi-directional real-time communication without a complex wire connection.

For this purpose, a separate local area communication module, for example a chip type module, has come into wide use. As shown in FIG. 1, a local area communication module 51 is installed within the communication equipment, i.e., a portable terminal 50. Further, another local area communication module 14 is installed within a wireless headset 10. Therefore, a communication signal is bi-directionally transmitted and received between the portable terminal 50 and the wireless headset 10 using the two local area communication modules 51 and 14, respectively. As shown in FIG. 2, in the case where the local area communication module 41 is an external type, an interface module 40 for local area communication is additionally required and connected to the portable terminal 50. In FIG. 1, the wireless headset 10 comprises a microphone 11, a speaker 12, a communication on/off switch 13, and the local area communication module 14 installed within a main body of the wireless headset 10. A rod 20 provided with the microphone 11 at its lower end is installed at an lower surface of the main body of the wireless headset 10. The wireless headset 10 further comprises a hook 30 worn behind a user's ear. Further, in order to operate the wireless headset 10, a general battery or a rechargeable battery 15 is installed in the wireless headset 10. In case of the rechargeable battery 15, a charger (not shown) for charging the rechargeable battery 15 is additionally provided.

Since the conventional wireless headset of FIG. 1 uses the internal local area communication module which is separated from the communication equipment, the wireless headset moves independently of the communication equipment, and it has been found that wireless headsets are reluctantly used by the communication equipment users. Further, the conventional wireless headset shown in FIG. 2 uses the external local area communication module embodied in the separate interface module for local area communication so as to be connected to the communication equipment, and thus the requirement for the extra piece of equipment causes inconvenience to users. Moreover, since the communication equipment having the internal local area communication module requires the rechargeable battery installed within the wireless headset and the charger for charging the rechargeable battery, the rechargeable battery of the wireless headset must be charged by the charger whenever the wireless headset is used.

Due to the increased use of portable terminals, drivers increasingly communicate with a counterpart using the terminals while the car they are driving is in motion. The drivers' use of the portable terminal obstructs their driving and then prevents the drivers from concentrating their attention on driving, thereby frequently causing traffic accidents. In order to prevent such accidents, a hands-free device separately installed in their cars is required so that the drivers may safely use the portable terminal. In particular, while driving and using the wireless headset, it is difficult for the driver to know the state of an incoming call. It is also difficult for the user to know whether the battery of the wireless headset needs to be recharged, particularly when the user is wearing the headset and participating in a telephone call.

SUMMARY OF THE INVENTION

Therefore, the present invention has been made in view of the above problems, and it is an object of the present invention to provide a wireless headset apparatus, in which a wireless headset is detachably attached to a communication equipment using a local area communication module, thereby improving the utility of the wireless headset.

It is a further object of the present invention to provide a wireless headset apparatus provided with a vibrating motor for supplying vibration to a wireless headset separated from a communication equipment using a local area communication module so as to inform a user of an incoming, call, thereby widening a sphere of use of the communication equipment and the wireless headset.

It is another of the present invention to provide a wireless headset apparatus, in which a wireless headset is, detachably attached to a communication equipment using a local area communication module, and the wireless headset and the communication equipment are simultaneously chargeable, thereby allowing the wireless headset to be easily charged.

It is yet another of the present invention to provide a wireless headset apparatus, in which a wireless headset is detachably attached to a communication equipment using a local area communication module, thereby being used as hands-free means by a driver in driving.

In accordance with the present invention, the above and other objects can be accomplished by the provision of a wireless headset apparatus comprising an attachment recess formed on a designated position of a communication equipment, and a wireless headset detachably attached to the attachment recess.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

Figure 1:
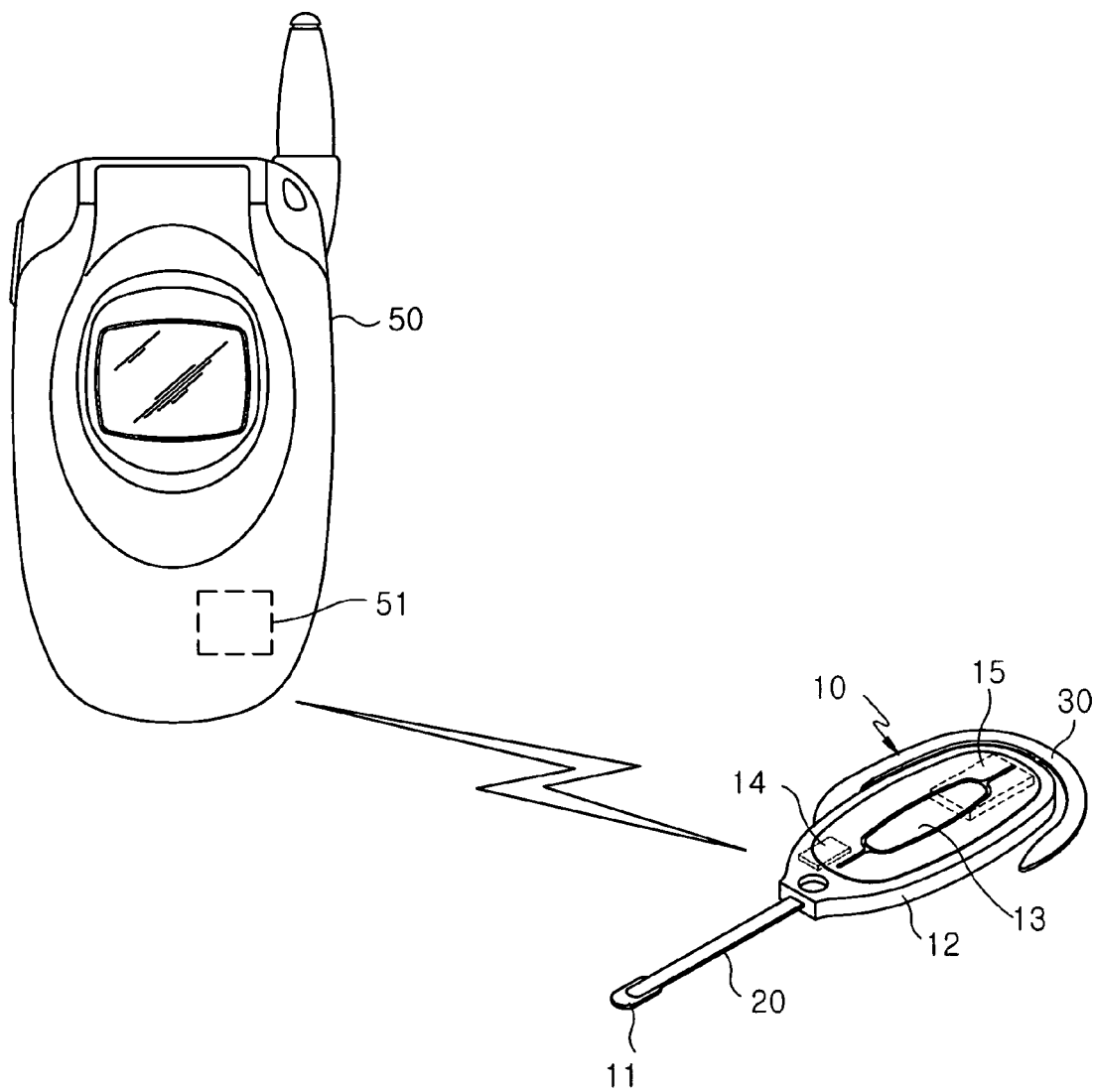
FIG. 1 is a perspective view of a conventional wireless headset using an internal local area communication module while in use.
Figure 2:
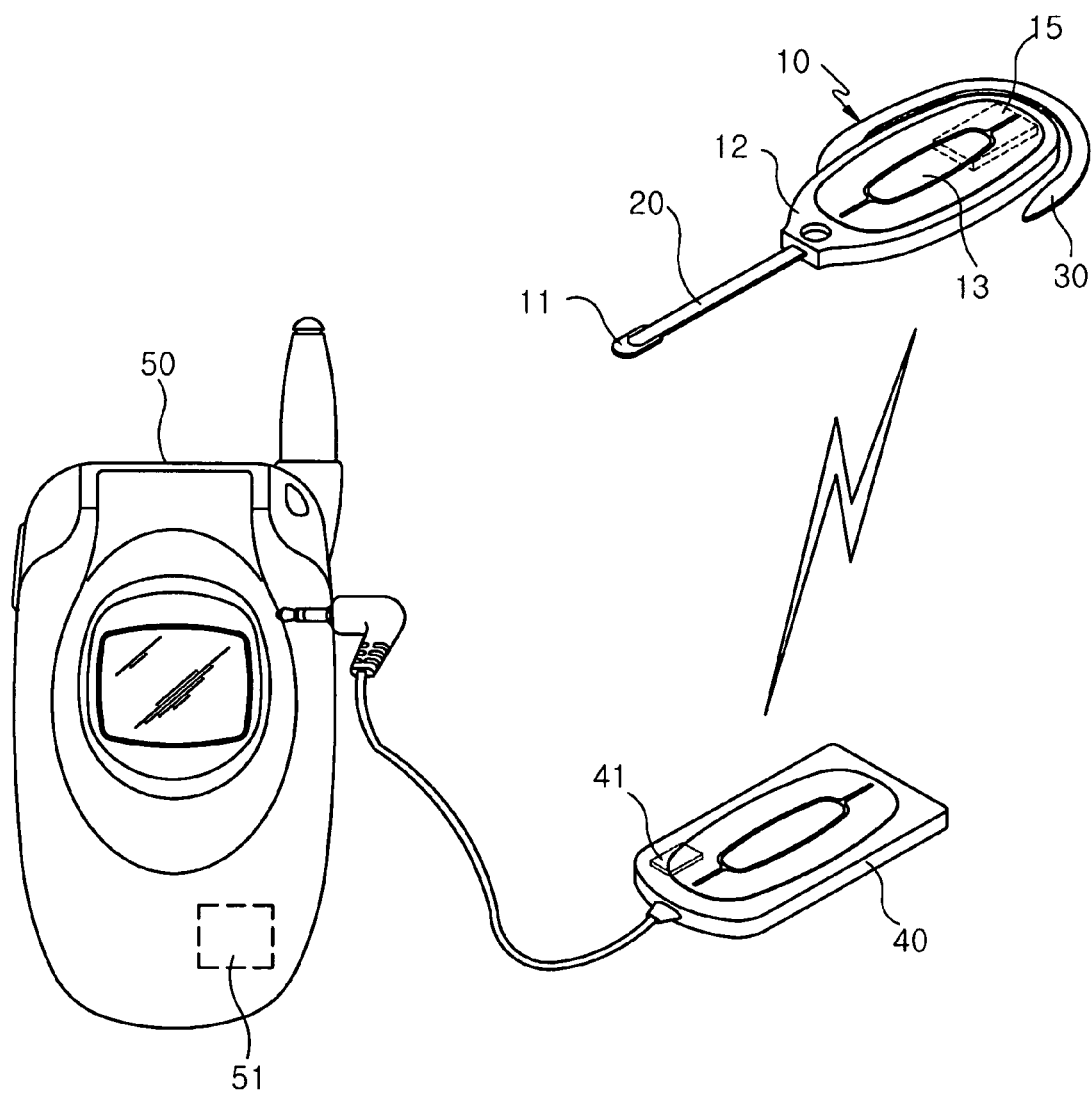
FIG. 2 is a perspective view of a conventional wireless headset using an external local area communication module while in use.

Now, preferred embodiments of the present invention will be described in detail with reference to the annexed drawings. In the drawings, the same or similar elements are denoted by the same reference numerals even though they are depicted in different drawings. In the following description, a detailed description of known functions and configurations incorporated herein will be omitted when it may make the subject matter of the present invention unclear.

Figure 3:
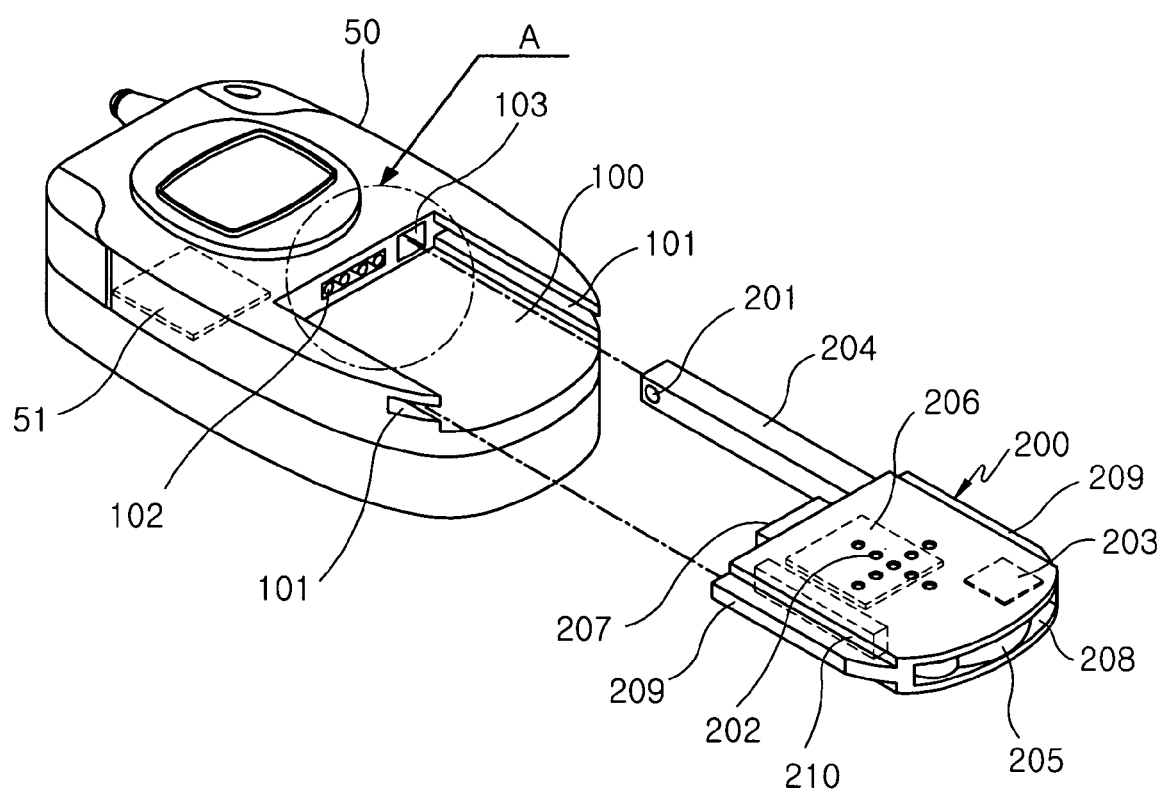
FIG. 3 is a perspective view of a wireless headset apparatus and portable terminal in accordance with an embodiment of the present invention where the wireless headset is detached from the portable terminal.
Figure 4:
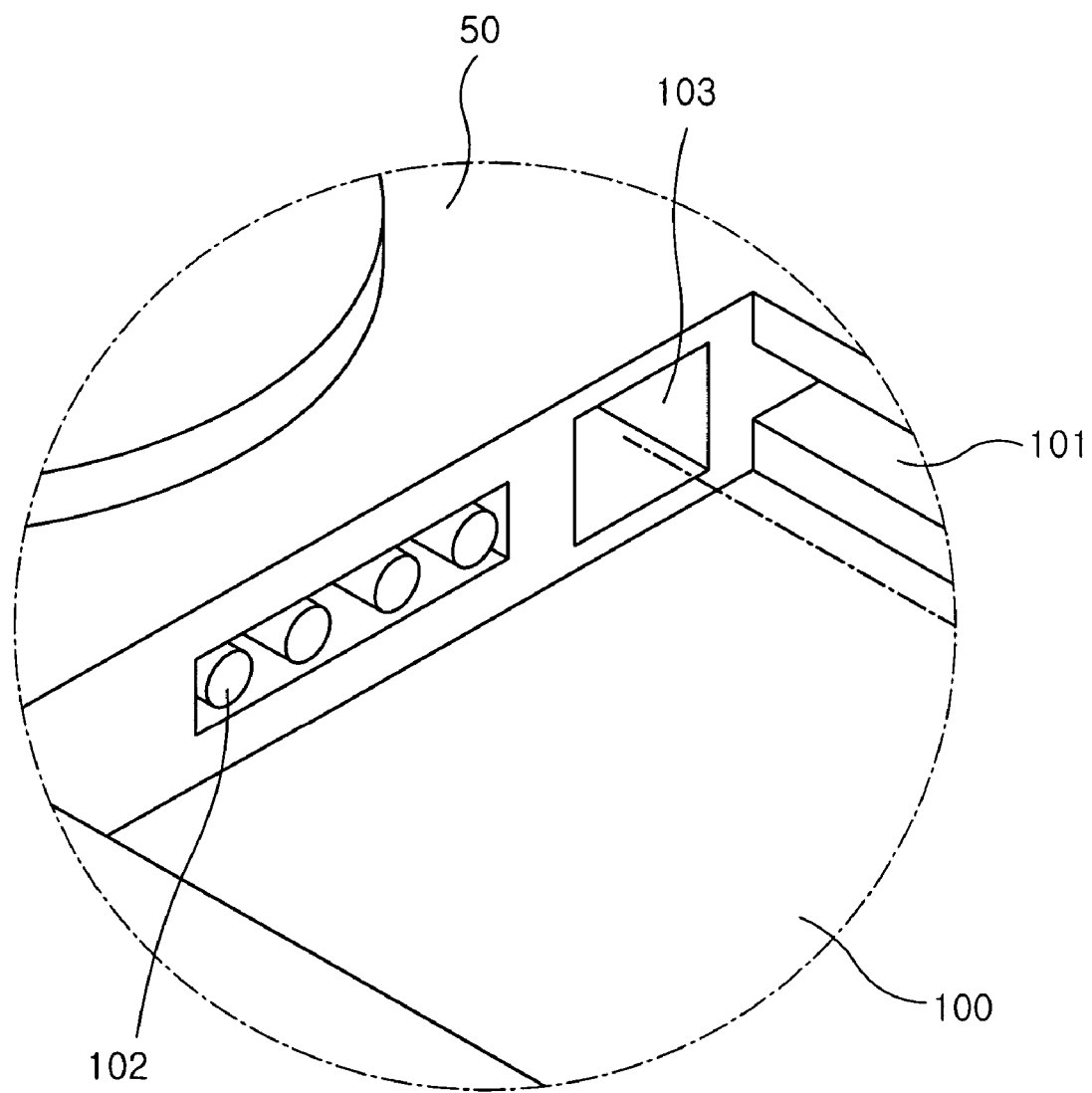
FIG. 4 is an enlarged view of a portion "A" of FIG. 3.
Figure 5:
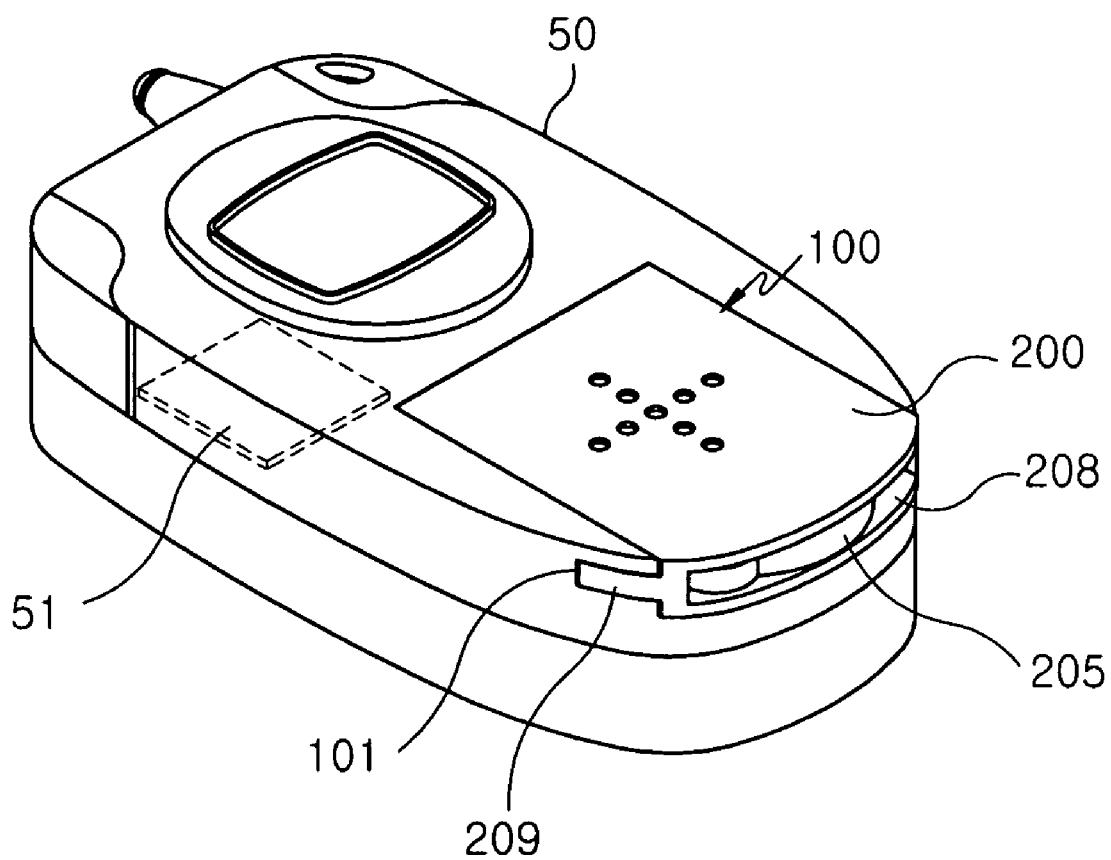
FIG. 5 is a perspective view of the wireless headset apparatus and portable terminal in accordance with the embodiment of the present invention with the wireless headset assembled to the portable terminal.

As shown in FIGS. 3 to 8, a main body of a wireless headset 200 comprises a microphone 201, a speaker grill 202, and a local area communication module 206. Further, a rod 204 provided with the microphone 201 is installed on and extends from a lower surface of the wireless headset 200. A hook 205 to be worn behind a user's ear is installed on an upper surface of the wireless headset 200 and extends from and retracts into cavity 208. Folder-type portable terminal 50 using the wireless headset 200 includes attachment recess 100 formed at a designated position of the folder-type portable terminal 50, thereby attaching and detaching the wireless headset 200 to and from the portable terminal 50. Thai is, the wireless headset 200 is detachably attached to portable terminal 50 at the attachment recess 100, so that when attached, the headset preferably completes the external profile of the portable terminal 50, as shown in FIG. 5.

The attachment recess 100 has an opened end so that the wireless headset 200 may be inserted thereinto. Guide grooves 101 are formed along both side surfaces of the attachment recess 100, so as to guide the below-described guide protrusions 209 formed on both side surfaces of the wireless headset 200 when the wireless headset 200 is attached to the attachment recess 100. Herein, the guide grooves 101 are longitudinally formed along the both side surfaces of the attachment recess 100. A female connector 102 is formed at an end wall of the attachment recess 100 so as to electrically connect the wireless headset 200 to the portable terminal 50 as soon as the wireless headset 200 is fit into the attachment recess 100. An insertion hole 103 for accommodating the rod 204 of the wireless headset 200 is formed in the same end wall as the female connector 102, adjacent to the female connector 102. The female connector 102 serves to turn on/off the local area communication module 206 of the wireless headset 200 according to the attachment and detachment of the wireless headset 200 to and from the portable terminal 50, so that the portable terminal 50 can be used in a conventional manner when the headset is attached to the terminal as in FIG. 5. The female connector 102 also electrically connects the wireless headset 200 to the speaker grill 202 of the folder-type portable terminal 50 when the wireless headset 200 is attached into the attachment recess 100. Further, the female connector 102 is connected to a charging line of the folder-type portable terminal 50 so that a rechargeable battery 203 installed within the wireless headset 200 is charged, as soon as the wireless headset 200 is attached into the attachment recess 100. A male connector 207 is installed on an end wall of the wireless headset 200 so as to be electrically connected and fixed to the female connector 102.

Cavity 208 is formed in the other end of the wireless headset 200 so that the hook 205 of the wireless headset 200 can be drawn into and out of the cavity 208. Herein, the cavity 208 is made of a ductile material with elasticity so that the hook 205 may be easily drawn into and out of the cavity 208. The guide protrusions 209 are longitudinally formed along both side surfaces of the wireless headset 200 so as to be slid along the guide grooves 101 when the wireless headset 200 is attached to and detached from the attachment recess 100. Further, a vibrating motor 210 is further installed within the wireless headset 200, thereby receiving an incoming call signal from the communication equipment and then supplying a vibration to inform a user of an incoming call.

With continued reference to FIGS. 3 to 8, a process for operating the wireless headset apparatus in accordance with the preferred embodiment of the present invention is described in detail, as follows.

As shown in FIGS. 3 and 4, the local area communication module 51 is installed within a communication equipment such as the portable terminal 50, a computer such as a CD player, MP3 player, DVD player, portable radio, etc. (not shown), and an electronic appliance (not shown), and the local area communication module 206 is installed in the wireless headset 200, thereby bi-directionally transmitting and receiving a communication signal between the communication equipment and the wireless headset 200.

In the preferred embodiment, one end of the attachment recess 100 is opened. The guide grooves 101 are longitudinally formed along the both side surfaces of the opened attachment recess 100. Therefore, the wireless headset 200 is attached to portable terminal 50 by sliding guide protrusions 209 into the guide grooves 101.

The guide protrusions 209 are formed along the both side surfaces of the wireless headset 200 so as to be slid along the guide grooves 101. Therefore, when the wireless headset 200 is inserted into the attachment recess 100, the guide protrusions 209 are engaged with the guide grooves 101 so that the guide protrusions 209 are slid along the guide grooves 101. When the wireless headset 200 is inserted into the attachment recess 100 by the sliding motion of the guide protrusions 209 along the guide grooves 101, the female connector 102 is engaged with the male connector 207 of the wireless headset 200. In addition, when the wireless headset 200 is attached into the attachment recess 100, the rod 204 is inserted into the insertion hole 103.

As shown in FIG. 5, when the female connector 102 is connected to the external connection 207, the wireless headset 200 is fixed to the attachment recess 100. Once the female connector 102 is electrically connected to the male connector 207, the local area communication module 206 of the wireless headset 200 is turned off. Further, the speaker grill 202 is electrically connected to the portable terminal 50.

Since the wireless headset 200 attached to the folder-type portable terminal 50 is electrically connected to the charging line (not shown) of the terminal 50, when the folder-type portable terminal 50 is charged, the rechargeable battery 203 installed within the wireless headset 200 is simultaneously charged.

Figure 6:
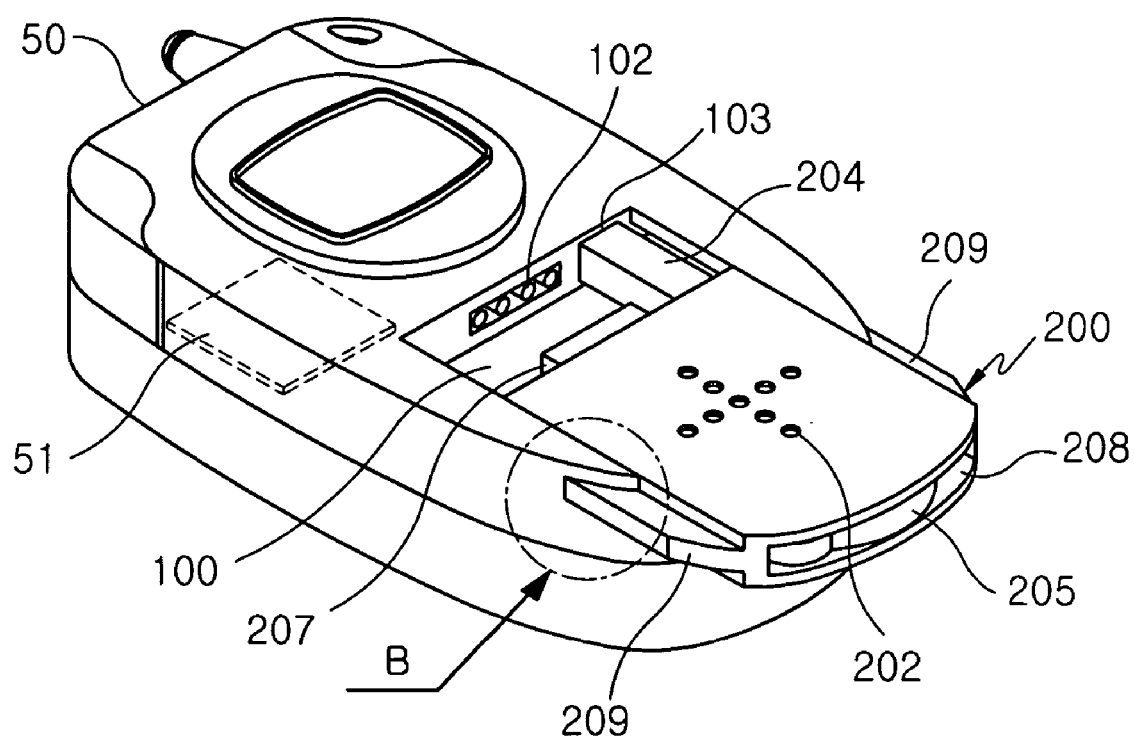
FIG. 6 is a perspective view of the wireless headset apparatus and portable terminal in which the wireless headset is being detached from the portable terminal in accordance with the embodiment of the present invention.
Figure 7:
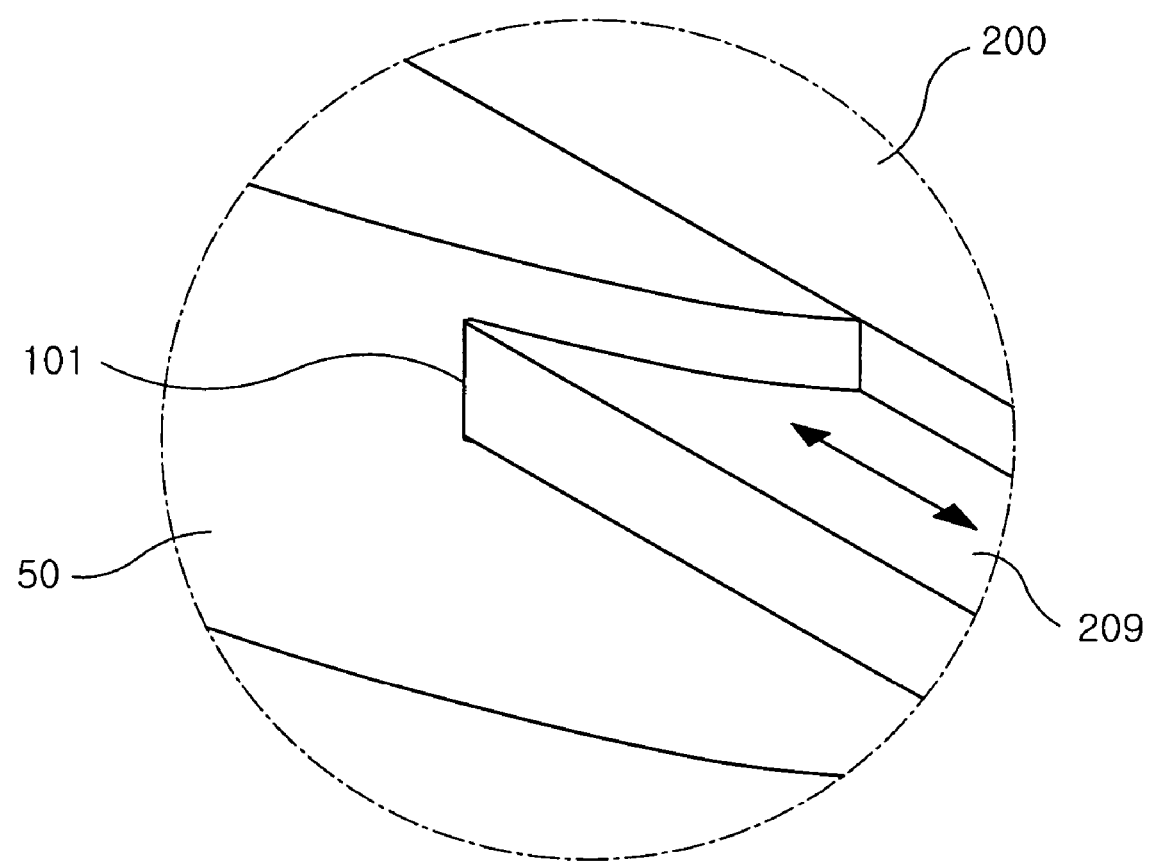
FIG. 7 is an enlarged view of a portion "B" of FIG. 6.

As shown in FIGS. 6 and 7, when a user wants to use the wireless headset 200, the user separates the wireless headset 200 from the attachment recess 100 of the portable terminal 50 by sliding the protrusions 209 along the grooves 101. Then, the male connector 207 is separated from the female connector 102. Herein, the local area communication modules 51 and 206 are turned on and operated, as the guide protrusions 209 of the wireless headset 200 are slid along the guide grooves 101 of the attachment recess 100 and then separated from the guide grooves 101.

Figure 8:
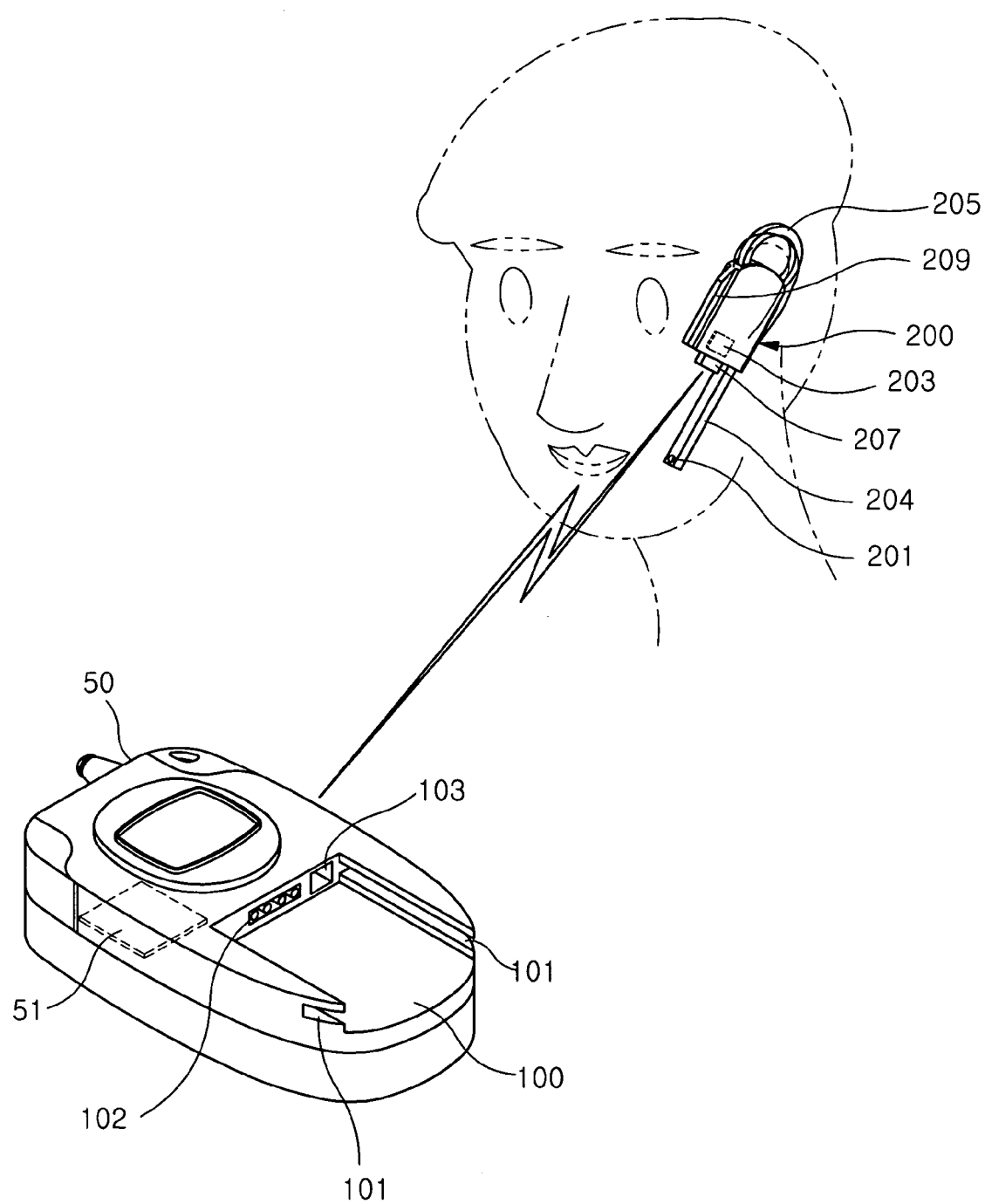
FIG. 8 is a perspective view of the wireless headset apparatus and portable terminal while in use in accordance with the embodiment of the present invention.

In this state, as shown in FIG. 8, the wireless headset 200 is worn behind a user's ear. Since the hole 208 provided with the hook 205 is formed in the other end of the wireless headset 200, the wireless headset 200 is fixed to the user's ear by hanging the hook 205 drawn out of the hole 208 on the user's ear. Therefore, in order to use the wireless headset 200, the user draws the hook 205 out of the hole 208, and then hangs the hook 205 on the user's ear.

The vibrating motor 210 is further installed within the wireless headset 200, thereby receiving an incoming call signal from the folder-type portable terminal 50 and then supplying a vibration to inform the user of an incoming call. Therefore, the user wearing the wireless headset 200 at his/her ear can sense the incoming call by means of the vibration of the vibrating motor 210, and then communicate with a counterpart, although the user does not attach the wireless headset 200 to the terminal 50.

As apparent from the above description, the present invention provides a wireless headset apparatus in which a wireless headset is detachably attached to a folder-type portable terminal, thereby improving the utility of the wireless headset.

Although only this embodiment of the present invention have been described in detail, those skilled in the art will appreciate that various modifications, additions, and substitutions to the specific elements are possible, without departing from the scope arid spirit of the invention as disclosed in the accompanying claims.

For example, the wireless headset apparatus of the present invention is not limitedly applied to the folder-type portable terminal, but may be applied to other portable terminals, computers, electronic appliances, and acoustic appliances.

What is claimed is:

1. A communication device and wireless headset apparatus comprising:

an attachment recess formed at a designated position on the communication device; and a wireless headset detachably attached to the attachment recess, wherein the attachment recess has an opened end, and includes guide grooves longitudinally formed along both side surfaces of the opened attachment recess so as to guide both side surfaces of the wireless headset;

a female connector formed at an end wall of the attachment recess so as to electrically connect the wireless headset to the communication device when the wireless headset is attached to the communication device at the attachment recess; and an insertion hole formed on the end wall adjacent to the female connector so as to accommodate a rod provided with a microphone of the wireless headset.

2. The apparatus as set forth in claim 1,
wherein the communication device and the wireless headset respectively include a local area communication module for communicating with each other.

3. The apparatus as set forth in claim 1,
wherein the female connector serves to turn on and off the local area communication modules according to the attachment and detachment of the wireless headset to and from the communication device.

4. The apparatus as set forth in claim 1,
wherein the female connector is electrically connected to a speaker line of the communication device when the wireless headset is attached to the communication device at the attachment recess.

5. The apparatus as set forth in claim 1,
wherein the female connector is electrically connected to a charging line of the communication device so as to charge a rechargeable battery installed within the wireless headset.

6. The apparatus as set forth in claim 1,
wherein a male connector is installed on an end of the wireless headset so as to be electrically connected and fixed to the female connector, and a cavity is formed in another end of the wireless headset so that a hook of the wireless headset is drawn into and from the cavity.

7. The apparatus as set forth in claim 6,
wherein the hook is made of a ductile material.

8. The apparatus as set forth in claim 1,
wherein guide protrusions are longitudinally formed along both side surfaces of the headset so as to be slid along the guide grooves.

9. The apparatus as set forth in claim 1,
wherein a vibrating motor is further installed within the wireless headset so as to receive an incoming call signal from the communication device, and then vibrate.

10. A portable communication terminal comprising:

a main body having a display, a plurality of keys for inputting data, a speaker, and antenna, the main body having a recess on at least one surface thereof; and a wireless headset having a speaker, and a microphone; wherein the wireless headset is detachably secured to the main body at said recess, wherein the recess has an opened end, and includes guide grooves longitudinally formed along both side surfaces of the opened recess so as to guide both side surfaces of the wireless headset; a female connector formed at an end wall of the recess so as to electrically connect the wireless headset to the communication terminal when the wireless headset is attached to the communication terminal at the recess; and an insertion hole formed on the end wall adjacent to the female connector so as to accommodate a rod provided with a microphone of the wireless headset.

11. An audio device capable of outputting sound, comprising:

a main body housing electrical components of the audio device, the main body having a recess on at least one surface thereof; and a wireless headset having at least one speaker and a microphone; wherein the wireless headset is detachably secured to the main body at said recess, wherein the recess has an opened end, and includes guide grooves longitudinally formed along both side surfaces of the opened recess so as to guide both side surfaces of the wireless headset;

a female connector formed at an end wall of the recess so as to electrically connect the wireless headset to the audio device when the wireless headset is attached to the audio device at the recess; and an insertion hole formed on the end wall adjacent to the female connector so as to accommodate a rod provided with a microphone of the wireless headset.

* * * * *